Sept. 13, 1938.  E. M. KRUEGER  2,129,943
DISK METER
Filed May 13, 1935
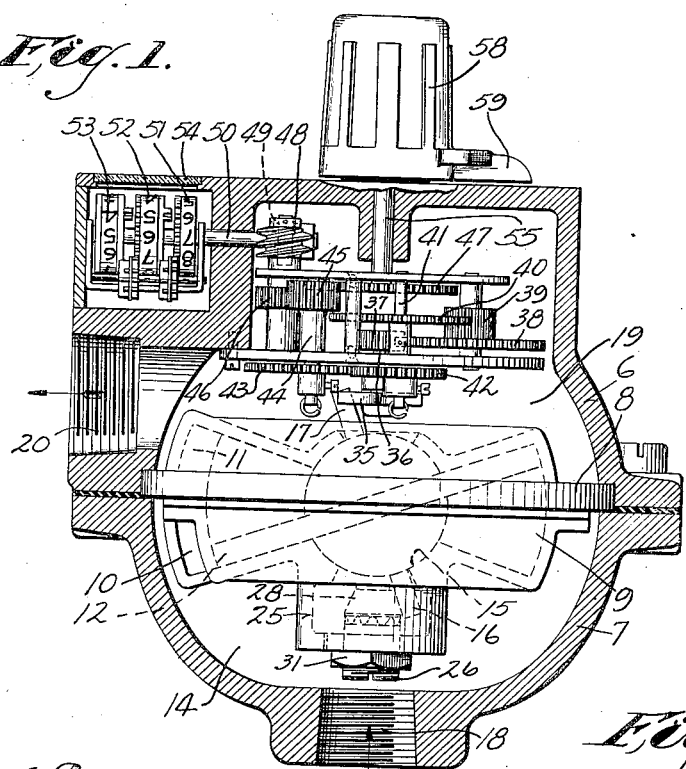
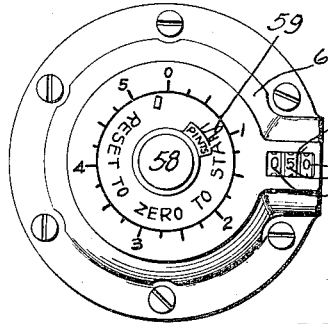
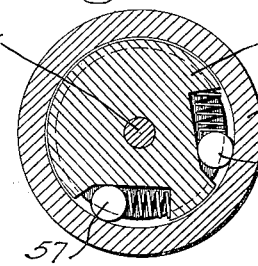
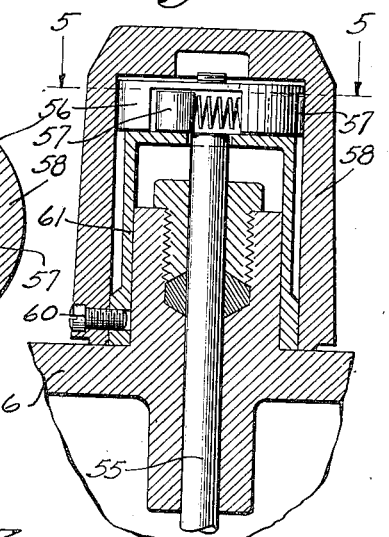
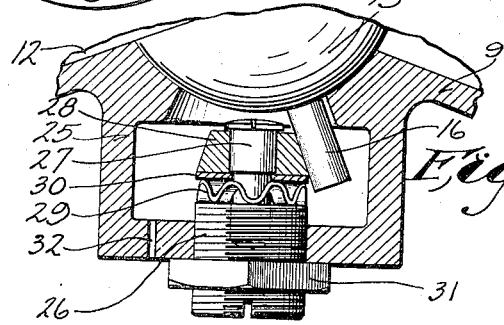
INVENTOR
Emil M. Krueger
BY Wheeler, Wheeler and Wheeler
ATTORNEYS Patented Sept. 13, 1938

2,129,943

UNITED STATES PATENT OFFICE 2,129,943

DISK METER

Emil M. Krueger, Milwaukee, Wis., assignor to Badger Meter Manufacturing Company, Milwaukee, Wis., a corporation of Wisconsin Application May 13, 1935, Serial No. 21,184

2 Claims. (Cl. 73—258)

This invention relates to improvements in disk meters.

It is the primary object of the invention to provide a novel and improved meter structure capable of handling grease and other heavy lubricants and provided with an adjustable and yieldable bearing for the shaft of the wobble disk; with means for by-passing sufficient lubricant to lubricate the wobble disk bearings without materially affecting the meter reading; with a combined register gear train and change speed gear set; and with a novel and improved register construction.

In the drawing:

Figure 1 is a vertical axial section through a meter embodying this invention.

Figure 2 is a plan view of the meter on a reduced scale.

Figure 3 is an enlarged fragmentary detail showing the lower bearing for the wobble disk metering piston.

Figure 4 is an enlarged detail in axial section showing the reset mechanism of the indicator.

Figure 5 is a view taken in section on the line 5—5 of Figure 4.

Like parts are identified by the same reference characters throughout the several views.

The meter casing comprises upper and lower sections 6 and 7 having peripheral flanges screwed together in a conventional manner in clamping relation upon the ring 8 of the metering chamber 9. The metering chamber is of generally conventional design having an intake port at 10 and an outlet port at 11. The flow of lubricant between these ports must occur circuitously about the inside of the chamber 9 and must occasion an orbital displacement of the wobble disk piston 12.

As is usual in such devices, the wobble disk piston 12 is mounted on a spherical bearing member 15 engaged between spherical bearing surfaces of the top and bottom of the meter chamber 9. Openings in these bearing surfaces permit the shaft sections 16 and 17 to project.

The metering chamber 9 and its flange 8 comprise a partition across the casing between sections 6 and 7 thereof. The space 14 below this partition represents the high pressure side of the meter to which the lubricant to be metered is admitted through port 18. The lubricant which passes through the metering chamber and escapes from port 11 enters the low pressure chamber 19 and will substantially fill of the meter casing and will substantially fill chamber 19, whereby to lubricate all of the gearing hereinafter to be described. Thence the lubricant leaves the device through the discharge port 20.

The metering chamber 9 is provided with a cup-like extension at 25 into which the shaft element 16 projects. The screw 26 adjustably threaded into the bottom of the cup 25 carries a headed pin 27 which serves as an axis upon which the tapered frusto-conical roller 28 is rotated. The roller is yieldably supported at a given elevation on pin 27 by means of a resilient compression washer 29 comprising a convoluted annular spring acting through a thrust washer 30. The lock nut 31 maintains the adjustment of screw 26.

In the orbital movement of shaft 16 with the wobble piston 12, the shaft 16 will revolve upon the bearing roller 28. In case any obstruction is encountered tending to cause the wobble disk piston to stick suddenly, the shock is absorbed by the compression spring 29 which permits roller 28 to yield under the thrust of the shaft section 16.

Normally the roller 28 will engage the head of pin 27 to be positioned thereby at such a level that there will be little, if any, pressure of the roller upon the shaft 16. The accuracy of operation of the wobble disk piston is promoted, however, by allowing no play between the parts, and accordingly, if any wear occurs, the piston may be readjusted for its most effective operation by loosening the lock nut 31 and turning up the adjusting screw 26.

Cup 25 is preferably provided with a very small opening 32 which places its interior in communication with the pressure side 17 of the meter casing. A very small amount of the lubricant handled by the meter will therefore be permitted to pass through the duct 32 to the interior of the cup element 25 and thence upwardly between the bearing surfaces of the ball 15 and the metering chamber 9. As a result the roller 28, shaft 16, and ball 15 will always be fully lubricated and the ball will in effect be floated upon the lubricant to minimize frictional resistance to its movement.

In a conventional meter assembly it is common practice to have a set of change gears and a separate register gear train. In the present device the register gear train and the change gear set is consolidated in one unit, this being possible primarily because of the fact that the lubricant handled by the meter has access to the entire gear train and thereby protects it from the overload which would occur if it were less well lubricated.

The orbital movement of the shaft 17 is transmitted to an arm 35 mounted on the driving shaft 36 of the gear train. Thence motion is transmitted to pinion 37, gear 38, pinion 39, and gear 40, to the intermediate shaft 41 which is provided removably with the interchangeable change speed gear 42.

The change speed gear 42 meshes with a second change speed gear 43 removably fixed to the lower end of shaft 44, which carries pinion 45. This pinion drives the totalizer gears 46 and 47. Gear 46 is connected with a worm 48 which drives a worm wheel 49 on the totalizer shaft 50. This shaft operates the first of a series of totalizer disks 51, 52, and 53, bearing numerals on their peripheries which are exposed through a window slot at 54 to show the total number of units metered.

The gear 47 is mounted on a shaft 55 which projects upwardly through the top of the meter casing and drives an indicator which may be reset to zero after the commencement of each metering operation.

Screwed to the top of shaft 55 is a disk 56 recessed to receive one or more spring biased clutch elements 57. In the direction of rotation of shaft 55 these clutch elements engage the cylindrical inner periphery of the cap-shaped handle member 58 to rotate such member in the direction to advance its indicating pointer 59 over a calibrated scale carried by the top of the meter casing. The handle member 58 would be freely removable axially from shaft 55 if it were not connected by set screw 60 with an interior thimble 61 apertured to receive the shaft 55 and anchored beneath the disk 56. Thus the thimble 61 and the handle 58 turn unitarily together, the handle constituting an enclosure for the disk 56 and the clutch mechanism, and the thimble providing means for securing the handle against removal. The clutch mechanism permits the handle to turn freely with respect to the disk 56 and shaft 55 toward the zero point on the calibrated scale.

I claim:

1. In a meter of the class described, the combination with a casing comprising upper and lower sections, of a metering chamber within said casing arranged to discharge the material metered into the upper section thereof, a motor element within said chamber having an orbitally movable pin in said upper casing section, a gear train support intermediate the height of said upper section, a gear train comprising a driving shaft operatively connected to receive motion from said pin, a set of motion reducing gearing above said support comprising shafts projecting downwardly through said support, and intermeshing gears removably mounted below said support on said shafts, a driven shaft operatively connected to receive motion from said train, and a total-indicating register operatively arranged to be actuated by said driven shaft.

2. In a meter of the character described, the combination with a meter casing comprising suitably apertured inlet and outlet sections, of a metering chamber confined between said sections and having inlet and outlet ports communicating with the respective sections, said chamber constituting a partition between said sections, a wobble disk piston within said chamber provided with a spherical bearing element, said chamber having concave seats centrally apertured to receive said element, a pin projecting from said element through the aperture of one of said seats toward the inlet section of said casing, a chamber extension enclosing said pin and provided with a by-pass duct to admit thereto a minute portion of the material entering said inlet section, a gear train disposed in the outlet section of said casing and operatively connected with said piston to receive motion therefrom while fully exposed to the effluent from said chamber, and a totalizing register mounted on said casing and operatively connected with said train to be actuated thereby, together with a tapered bearing disposed in said chamber extension and defining the orbital path of movement of said pin, said bearing comprising an adjustable mounting and a yieldable support for said bearing on said mounting.

EMIL M. KRUEGER.